May 22, 1956 E. D. REED 2,746,156
STEM CALIPER FOR SHALLOW BORES
Filed April 23, 1953
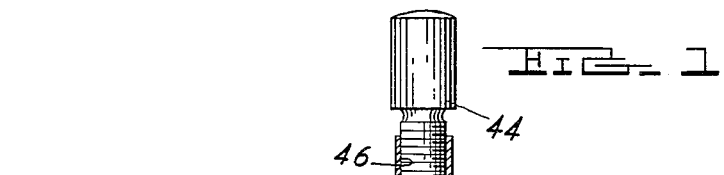
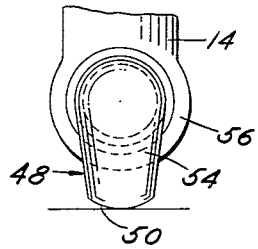
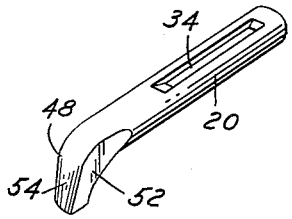
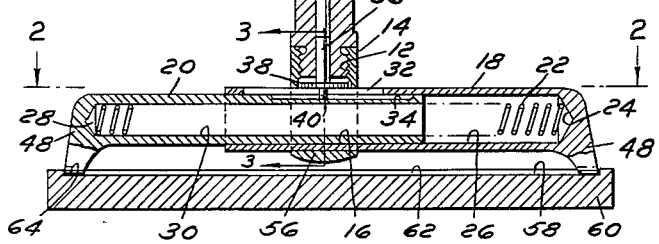
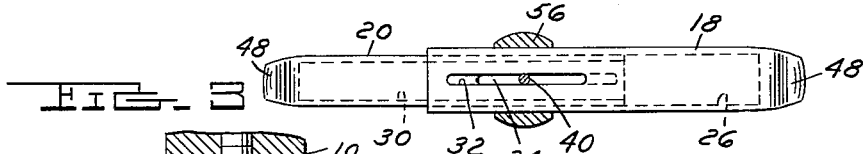
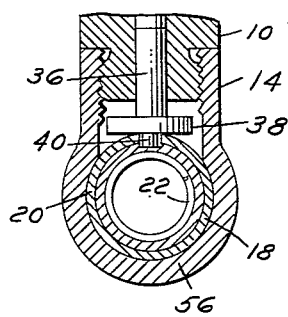
INVENTOR.
*Edwin D. Reed*
BY
*Barnes, Kisselle, Laughlin & Raisch*
ATTORNEYS

United States Patent Office 2,746,156
Patented May 22, 1956

2,746,156
STEM CALIPER FOR SHALLOW BORES
Edwin D. Reed, Detroit, Mich.

Application April 23, 1953, Serial No. 350,686

3 Claims. (Cl. 33—143)

This invention relates to a gauge and more particularly to a gauge known in the art as an inside telescope gauge.

It is an object of this invention to provide a gauge of the above described type which is admirably adapted for very accurately gauging the diameter of shallow bores.

One of the difficulties with most counterbore gauges with which I am familiar is the inability to measure accurately the diameter of a shallow counterbore or a blind hole at a point closely adjacent the bottom of the bore or hole. The gauges of the prior art are usually constructed with a pair of telescoping gauging elements the outer ends of which are rounded. These two telescoping gauge members are usually supported by means of a handle extending perpendicularly therefrom and having an enlarged head or hub at one end provided with a through opening in which the outer of the telescoping members is mounted. This enlarged head coupled with the fact that the outer ends of the telescoping members are rounded prevents use of the gauge in very shallow counterbores and the like because the enlarged head will contact the bottom wall of the counterbore, and thus the outermost surface portions of the ends of the gauging members are spaced considerably above the bottom wall of the counterbore. The gauge of my invention is constructed to eliminate this difficulty.

In the drawings:

Fig. 1 is a vertical sectional view through a telescope gauge of the present invention showing the manner of its use in connection with a shallow counterbore in a work piece.

Fig. 2 is a sectional view of the gauge taken generally along the line 2—2 in Fig. 1.

Fig. 3 is a fragmentary sectional view along the line 3—3 in Fig. 1.

Fig. 4 is a fragmentary end view of the gauge.

Fig. 5 is a perspective view of the inner telescoping member.

Referring to the drawings, it will be observed that the gauge comprises a handle portion 10 the lower end of which is threaded as at 12 for threaded engagement with a socket in a heat member 14. The head 14 has a through opening 16 the axis of which extends transversely of the axis of handle 12. Within opening 16 there is slidably mounted a tubular gauging element 18, and a second tubular gauging element 20 is telescoped within element 18. These telescoped members are urged in diametrically opposite directions by means of a coil compression spring 22 incased within the elements having one end acting against the end wall 28 in the bore 30 in element 20. It will be noted that the diameter of bore 26 is dimensioned to receive member 20 with a smooth sliding fit.

In order to prevent members 18 and 20 from separating completely, these members are provided with registering axially extending slots, the slot in member 18 being a through slot and designated 32 and the slot in member 20 being shallow and designated 34. A locking pin 36 is fashioned with a disc portion 38 and a reduced end portion 40, the end portion 40 being adapted to project into the registering slots 32 and 34. Thus, when the inner axial end of slot 32 abuts against one side of the end portion 40 and the inner axial end of slot 34 abuts against the opposite side of the end portion 40, the members 18 and 20 are prevented from moving further outwardly relative to each other.

Members 18 and 20 are adapted to be locked in a telescoped position by means of a spindle 42 provided with a knob 44 having a threaded connection 46 with the upper end of handle 10. At its lower end spindle 42 abuts against the lock pin 36 so that, when knob 44 is turned in a direction inwardly of handle 10, disc 38 is caused to be pressed against the outer top side of member 18, and the extreme end of the projecting portion 40 is caused to be pressed against the base of groove 34. This frictional engagement between the lock pin 36 and the members 18 and 20 is sufficient to hold the members 18 and 20 in relatively fixed telescoped positions on head 14. At the same time the lock pin 36 retains the members 18 and 20 in circumferentially fixed positions relative to each other.

At their outer ends the members 18 and 20 are each formed with an outwardly and downwardly depending foot member 48. The foot members 48 terminate at their lower ends in an arcuate face 50. The side faces 52 are substantially flat, and the outer end face 54 of each foot member slopes outwardly in a downward direction and is arcuately shaped in horizontal section. The bottom face 50, it will be observed, lies in a plane spaced below the lowermost portion of the hub 56 of head 14 in which the hole 16 is formed.

When it is desired to gauge a shallow bore such as shown at 58 in a work piece 60, the members 18 and 20 are telescoped together and inserted in the bore 58 with the bottom faces 50 contacting the bottom wall 62 of the counterbore. The members are then released and permitted to expand to a position where the outer face 54 of the one foot member and the outer face 54 of the other foot member contact the wall 64 of the counterbore at diametrically opposite points. With the members 18 and 20 in this position knob 44 is threaded inwardly of handle 10 to thereby frictionally lock members 18 and 20 together. It will be observed that the configuration of the foot members 48 enables gauging the diameter of bore 58 at a point closely adjacent the bottom wall 62 of the counterbore. Gauging at this location is permitted by reason of the fact that the members 18 and 20 are provided with the depending foot portions 48, the outer end faces 54 of which slope in a downward and outward direction and the bottom faces 50 of which are disposed below the lowermost portion of hub 56 and are of generally arcuate shape.

Thus, it will be seen that I have provided a telescope gauge for measuring the diameter of shallow bores and the like which is of relatively simple construction and which at the same time is designed to accurately check the size of a bore or a blind hole at a point closely adjacent the bottom of the bore or hole.

I claim:

1. A counterbore gauge comprising an elongate handle having a head member at the lower end thereof, said head member being provided with a through opening therein the axis of which is perpendicular to the axis of said handle, inner and outer telescoping members mounted in said opening in said head with a portion of said head extending circumferentially around one of said telescoping members, said telescoping members each having a foot portion at the outer end thereof, said foot portions being fixed on and projecting downwardly from said telescoping members and extending at all times beyond the axial projection of said head, said foot members each having an outer end face which is convex in horizontal section and which slopes continuously inwardly in an upward direction, each of said foot members also having a lower end face which intersects said outer end face to form a sharp corner edge which defines the outermost edge on the bottom face of each foot portion.

2. A counterbore gauge as set forth in claim 1 wherein said lower end face of each foot portion is of convex shape in a plane normal to the axis of said telescoping members.

3. A counterbore gauge as called for in claim 2 wherein said outer end face and said lower end face of said foot portions are defined by arcuate surfaces.

References Cited in the file of this patent

UNITED STATES PATENTS

| | | |
|---|---|---|
| 1,140,611 | Reschke | May 25, 1915 |
| 1,860,640 | Witchger | May 31, 1932 |
| 2,478,427 | Schmid | Aug. 9, 1949 |
| 2,563,984 | Witchger | Aug. 14, 1951 |
| 2,566,160 | Bowers | Aug. 28, 1951 |

FOREIGN PATENTS

| | | |
|---|---|---|
| 564,699 | Great Britain | Oct. 10, 1944 |